United States Patent
Zhang et al.

(10) Patent No.: US 9,834,652 B2
(45) Date of Patent: Dec. 5, 2017

(54) REGENERATED CELLULOSE FILM, FUNCTIONAL FILM AND PREPARATION METHOD THEREFOR

(71) Applicants: INSTITUTE OF CHEMISTRY, CHINESE ACADEMY OF SCIENCES, Beijing (CN); Shandong Henglian New Materials Co., Ltd, Weifang, Shandong (CN)

(72) Inventors: Jun Zhang, Beijing (CN); Xiaoyu Zhang, Shandong (CN); Jian Yu, Beijing (CN); Ruifeng Li, Shandong (CN); Jin Wu, Beijing (CN); Yugang Gao, Shandong (CN); Jinming Zhang, Beijing (CN); Jinjiang Qiu, Shandong (CN)

(73) Assignee: INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 15/033,382

(22) PCT Filed: Aug. 22, 2014

(86) PCT No.: PCT/CN2014/084986
§ 371 (c)(1),
(2) Date: Apr. 29, 2016

(87) PCT Pub. No.: WO2015/062348
PCT Pub. Date: May 7, 2015

(65) Prior Publication Data
US 2016/0251489 A1 Sep. 1, 2016

(30) Foreign Application Priority Data
Nov. 1, 2013 (CN) .......................... 2013 1 0535909

(51) Int. Cl.
*C08J 5/18* (2006.01)
(52) U.S. Cl.
CPC .............. *C08J 5/18* (2013.01); *C08J 2301/02* (2013.01)
(58) Field of Classification Search
CPC .................................................. C08J 2301/02
See application file for complete search history.

(56) References Cited

U.S. PATENT DOCUMENTS

| 5,658,524 A * | 8/1997 | Portnoy ............. A22C 13/0013 264/186 |
| 2003/0183976 A1 | 10/2003 | Hendriks et al. |
| 2008/0187735 A1* | 8/2008 | Hammer ............ A22C 13/0013 428/219 |

FOREIGN PATENT DOCUMENTS

| CN | 1224435 A | 7/1999 |
| CN | 1261496 C | 6/2006 |
| CN | 100365050 C | 1/2008 |
| CN | 100400579 C | 7/2008 |
| CN | 100424259 C | 10/2008 |
| CN | 101880411 A | 11/2010 |
| CN | 101160325 B | 4/2012 |
| CN | 101007853 B | 10/2012 |
| WO | 9724215 A1 | 7/1997 |
| WO | 9849224 A1 | 11/1998 |
| WO | 02100925 A1 | 12/2002 |
| WO | 02100926 A1 | 12/2002 |

OTHER PUBLICATIONS

Visualizing Strain, 2012.*
Yisen Li, "Development of BOPP Specific Raw Material", China Synthetic Resins Plastics, 1991, vol. 8, No. 4, pp. 25-30 (English Abstract on the last page).

* cited by examiner

*Primary Examiner* — Melvin C Mayes
*Assistant Examiner* — Stefanie Cohen
(74) *Attorney, Agent, or Firm* — Novick, Kim & Lee, PLLC; Allen Xue

(57) ABSTRACT

This invention relates to a regenerated cellulose film, a functional film and preparation method thereof. The method mainly comprises the following steps: (1) shaping a cellulose/ionic liquid solution by die extrusion, calendering and casting; (2) the shaped solution entering into a coagulation bath to form a cellulose gel film; (3) in coagulation and washing processes, stretching the cellulose gel film at least 1 time in the transverse direction and at least 1 time in the longitudinal direction; (4) in drying process, further applying tension to the stretched film in the transverse and longitudinal directions, and finally obtaining a regenerated cellulose film by rolling. An organic and/or an inorganic functional additive can be added into the cellulose/ionic liquid solution to obtain a regenerated cellulose functional film. The regenerated cellulose film and the functional film thereof obtained by the above method have well-balanced and relative high longitudinal and transverse tensile strengths, as well as good flatness.

20 Claims, No Drawings

REGENERATED CELLULOSE FILM, FUNCTIONAL FILM AND PREPARATION METHOD THEREFOR

TECHNICAL FIELD

The present invention relates to a class of regenerated cellulose film (also known as cellophane, cellulose film), functional film and preparation method thereof, more particularly to a biaxially stretched regenerated cellulose film, a functional film and the preparation method thereof. The present invention belongs to the field of organic polymer.

BACKGROUND ART

Cellulose is a natural polymer having the widest distribution and the largest reserves in nature, and is an inexhaustible renewable source. Compared with synthetic polymers, cellulose has advantages such as complete biodegradability, non-toxicity, non-pollution, good biocompatibility, etc. With the daily exhaustion of oil, coal and other fossil resources, the research and development on cellulose-based materials are of great importance for the promotion of sustainable human development.

Regenerated cellulose film (also known as cellophane, cellulose film) prepared from cellulose as raw material is an important class of film material. The film has the features such as being non-toxic, transparent, antistatic, degradable, has good barrier and high temperature resistance, and has been widely used in the packaging of products such as food, pharmaceuticals, cosmetics, high-end clothing, precision instruments, etc. Because natural cellulose has high crystallinity and a number of inter-molecular and intra-molecular hydrogen bonds, it cannot be molten and is hard to be dissolved, resulting in poor processing performance. In industrial scale, the existing production processes of regenerated cellulose films mainly use viscose technology. After derivatization of natural cellulose, a cellulose solution is prepared, and then cellulose is regenerated. In the production process, not only the problems of high pollution and high energy consumption occur, but also cellulose degradation is severe during production, therefore it is difficult to improve the product performance.

Biaxial stretched technology has been widely used to improve physical and mechanical properties of polymer films. After nearly 30 or 40 years of rapid growth, it has formed a high production capacity, and products include a variety of synthetic polymers, for example, polypropylene, polyester, polystyrene, polyvinyl chloride, polyamide. Compared with non-stretched films, biaxially stretched polymer films have significantly improved mechanical strength, improved transparency and surface gloss, uniform thickness and small thickness deviation; improved barrier properties. However, the biaxial stretched technology requires polymer raw material with certain specific properties, for example, polymers should have high strength (see Development of BOPP Specific Material, Yisen Li, China Synthetic Resins Plastics, 1991, 8 (4): 25)

In the production of regenerated cellulose films by viscose technology, films can achieve high strength in longitudinal direction by adjusting the speed ratios among different rolls. In contrast, the cellulose films have a poor strength in transverse direction, resulting severe shrinkage. Because the molecular weight degradation of cellulose in the derivatization process is severe, the transverse tensile strength of the cellulose films produced by viscose technology cannot be improved by stretching transversely.

In a solvent system for non-derivatized cellulose, such as N-methylmorpholine-N-oxide (NMMO), the molecular weight degradation of cellulose is reduced during dissolving and regenerating. The obtained films can be stretched in a transverse direction. Therefore, it is possible to prepare biaxially stretched cellulose films.

PCT Application WO97/24215 provides a method for manufacturing a biaxially stretched regenerated cellulose film from a solution of cellulose in NMMO. By the method, the cellulose solution is extruded and adheres to an elastomeric film. Before the NMMO solvent is removed, the elastomeric film is stretched in order to biaxially stretch the solution of cellulose. However, because of the low strength of the solution of cellulose, the liquid film could easily crack during stretching, causing instability in the process. In addition, the stretch-oriented molecular chains in the solution could easily restore, and the shaped regenerated cellulose film may further shrink in the washing and drying processes, which could influences the improvement of the performance of the cellulose film. In PCT Application WO98/49224, a solution of cellulose in NMMO is extruded from an extrusion die into a coagulation bath. After washing out the NMMO solvent, the film is stretched transversely, and finally dried to be shaped; or after wetting the dried film, the film is stretched transversely. However, the transversely stretched film during drying can still have a certain degree of shrinkage, resulting in decreasing the size and the tensile strength of the film in the transverse direction. Therefore, based on the PCT application WO 98/49224, in PCT application WO02/100925, transverse stretching is performed in two steps when a cellulose film is formed after passing through a coagulation bath and NMMO is washed out, wherein in the first step the film is excessively stretched, and in the second step the stretched film is loosen to the desired stretching degree. In PCT Application WO02/100926, the transverse shrinkage of film is reduced by continually maintaining a certain tension on a transversely stretched film in the transverse direction. Although the obtained stretched film maintains a high dimensional stability when exposed to water or alkali solutions, the tensile strength of the stretched film in the transverse direction does not significantly increase and is less than 60% of the longitudinal strength, resulting in unbalanced performance in the transverse and longitudinal directions.

Recently, ionic liquids as a new class of green solvents for natural cellulose have attracted much attention, due to their strong dissolving ability, nonvolatile nature, good chemical and thermal stability, and easy recycling. There are patents about ionic liquids used to dissolve cellulose (see Chinese invention patents: ZL 02147004.9, ZL 02155945.7, ZL 02823875.3, ZL 200680012598.X, CN 200710085298.0). A patent also reports ionic liquids as a solvent for the preparation of regenerated cellulose film (see ZL 200410101800.9): a shaped solution of cellulose in ionic liquids enters into a coagulating bath to coagulate and regenerate. It is further washed and dried to give a cellulose film.

Currently, there has been no report about the preparation of biaxially stretched films by stretching transversely in the washing process after cellulose coagulates into a gel film. Our research has found that a solution of cellulose in ionic liquids after coagulation forms a cellulose gel film with excellent gel strength. Meanwhile, because a cellulose gel film containing an appropriate amount of ionic liquids has better deformability than that without the cellulose solvent which is completely removed, the former is more suitable for the biaxial stretching process; and the transversely stretched gel film could has increased width and decreased thickness, which are advantageous for washing the residual ionic liquid solvent in the film out and removing water from the film when drying. In addition, there has been either no report about the preparation of biaxially stretched cellulose functional films.

DETAILED DESCRIPTION OF THE INVENTION

An object of the present invention is to overcome the drawbacks of regenerated cellulose films produced in the prior art, which have poor and highly different transverse and longitudinal tensile strengths, and to provide a biaxially stretched regenerated cellulose film with high tensile strengths in both transverse and longitudinal directions and a functional film thereof.

Another object of the present invention is to provide a method for the preparation of the above-mentioned regenerated cellulose film and the functional film thereof.

The above-mentioned method provided in the present invention can be used in the preparation of a regenerated cellulose film using an ionic liquid as the cellulose solvent and the functional film thereof.

This invention can be realized by the following technical solutions.

A biaxially stretched regenerated cellulose film, wherein the stretch ratio of the cellulose film in the transverse direction to that in the longitudinal direction is not greater than 400%, and the ratio of the tensile strength in the longitudinal direction to that in the transverse direction is less than 1.8.

The biaxially stretched regenerated cellulose film of the invention can decrease the difference between the transverse and longitudinal tensile strengths. The ratio of the tensile strength in the longitudinal direction to that in the transverse direction of the invention is less than 1.8, preferably less than 1.5, even more preferably less than 1.4.

According to the present invention, the stretch ratio of said cellulose film in the transverse direction is between 101 and 400%, preferably between 150 and 300%; the stretch ratio in the longitudinal direction is between 110% and 400%, preferably between 150 and 300%.

According to the present invention, the stretch ratios of said cellulose film in the transverse direction and in the longitudinal direction can be same or different.

According to the present invention, said transverse stretching and longitudinal stretching can be carried out simultaneously or in separate steps. The transverse stretching can be carried out before longitudinal stretching; or the longitudinal stretching can also be carried out before transverse stretching.

According to the present invention, said cellulose film is stretched at least 1 time in the transverse direction, preferably 2 to 4 times, more preferably 1 to 3 times.

According to the present invention, said cellulose film is stretched at least 1 time in the longitudinal direction, preferably 2 to 4 times, more preferably 1 to 3 times.

It is known in the prior art, from the point of view of production, that in traditional processes by adjusting the speed ratios between different rolls, the film is easily stretched in the longitudinal direction; but it requires adding an apparatus to stretch in the transverse direction. Therefore the less times transverse stretching, the more economic, however, the more times stretching, the better for film performance. Overall, it can be stretched 2 to 4 times, preferably 1 to 3 times.

According to the present invention, the stretch ratios in the same direction may be the same or different each time. Using 3 times stretching as an example. When the stretch ratios are the same, the transverse stretch ratio each time is 120%; when the stretch ratios are different, the transverse stretch ratio may be 130% for the first time, 120% for the second time, 110% for the third time, or the transverse stretch ratio may be 125% for the first time, 125% for the second time, 105% for the third time. The total stretching times are as being mentioned above.

According to the present invention, said cellulose can be natural cellulose. Preferably, a degree of polymerization of natural cellulose as raw material is in the range from 200 to 2000. Said cellulose of the invention can be selected from at least one of the following cellulosic feedstock: microcrystalline cellulose, cotton pulp, wood pulp, bamboo pulp, skimmed cotton, sugarcane bagasse, wood and cellulose prepared from straw.

According to the present invention, said regenerated cellulose film can be obtained by stretching the shaped cellulose/ionic liquid solution.

According to the present invention, said cellulose/ionic liquid solution can be shaped by a known method of casting or calendering after being extruded via a die, and then passes through an air gap into a coagulation bath to form a cellulose gel film.

In the invention, the cellulose film contains solvents before drying, therefore it is named as a gel film. But after drying and completely removing the solvents, it is named as a cellulose film.

According to the present invention, said coagulation bath is a mixture of an ionic liquid and a non-solvent of cellulose such as water, methanol, ethanol or acetone, etc. In the coagulation bath, the weight ratio of an ionic liquid solvent to a non-solvent of cellulose is adjusted in the range of 0 to 150:100, and the temperature of the coagulation bath can be adjusted in the range of 10 to 80° C., thereby adjusting the coagulation rate of the cellulose. After the cellulose/ionic liquid solution enters into the coagulation bath, in the presence of a non-solvent of cellulose the cellulose coagulates into the shape of a film to give a gel film.

The invention also provides a biaxially stretched regenerated cellulose functional film, wherein said functional film includes the above-described cellulose film and an organic and/or inorganic functional additive.

The invention also provides a method for preparing a biaxially stretched regenerated cellulose film, wherein said method comprises the following steps:

(1) shaping a cellulose/ionic liquid solution by die extrusion, calendering and casting;

(2) the shaped solution entering into a coagulation bath to form a cellulose gel film;

(3) in coagulation and washing processes, stretching the cellulose gel film at least 1 time in the transverse direction and at least 1 time in the longitudinal direction;

(4) in drying process, further applying tension to the stretched film in the transverse and longitudinal directions, and finally obtaining a regenerated cellulose film by rolling.

The preparation method of the invention combines the ionic liquids solvent technology and biaxial stretching technology of cellulose to prepare a regenerated cellulose film and functional film thereof. In general, it has been found according to the present invention that by the whole process combination for preparing biaxially stretched cellulose film which comprises using ionic liquids as solvents, combining the preparation processes of shaping cellulose/ionic solutions, coagulating, washing, stretching, drying, etc., a biaxially stretched cellulose film can be prepared. Furthermore, the processes can provide the biaxially stretched cellulose film with performances superior to those of commercially available regenerated cellulose films.

The cellulose solution after die extrusion or the cellulose gel film can be stretched in a longitudinal direction using different speeds between the rolls. When in a gel film the weight ratio of an ionic liquid solvent to a non-solvent of cellulose is less than 4:1, the cellulose gel film is stretched one or more times in a transverse direction with a stretching apparatus (biaxial stretching machine, tenter machine or stenter machine). Stretching in separate steps may decrease the degree of stretch each time to reduce the risk of film breakage during stretching. The thickness of the film is reduced by transverse stretching, which is good for washing out the residual ionic liquid solvent in the cellulose gel film, and removing water or other non-solvents in the film during drying. In the drying process of the cellulose gel film, a stretching apparatus is used to stretch the film in the transverse direction or apply transverse tension to the film, which can prevent the film shrinkage during drying, and further improve balance in performances of the cellulose film in the transverse direction and the longitudinal direction.

In the present invention, transverse stretching and longitudinal stretching can be carried out simultaneously or in separate steps. The transverse stretching can be carried out before longitudinal stretching; or the longitudinal stretching can also be carried out before transverse stretching. In the invention, transverse stretch is preferably carried out 2 to 4 times, and the final transverse stretch ratio is between 101 to 400%. In the invention, longitudinal stretch is preferably carried out 2 to 4 times, and the longitudinal stretch ratio is between 110 to 400%.

According to the method of the invention, in step (2) said coagulation bath is a mixture of an ionic liquid and a non-solvent of cellulose such as water, methanol, ethanol or acetone, etc. Said coagulation bath can be a mixture with a weight ratio of the ionic liquid solvent to water or the other non-solvents of cellulose in the range of 0 to 150:100, preferably 0 to 120:100, more preferably 0 to 80:100.

According to the present invention, said temperature of the coagulation bath can be adjusted in the range of 10 to 80° C., thereby adjusting the coagulation rate of the cellulose. After the cellulose/ionic liquid solution enters into the coagulation bath, in the presence of a non-solvent, the cellulose is coagulated into the shape of a film to give a gel film.

According to the method of the invention, in step (3), in the coagulation and washing processes of the cellulose gel film, when the gel film the weight ratio of an ionic liquid solvent to a non-solvent of cellulose is less than 4:1, preferably 3:1, the cellulose gel film is stretched in the transverse direction and in the longitudinal direction.

In step (3), the cellulose gel film enters into the washing bath from the coagulation bath, and is washed to remove the ionic liquid contained in the film. Said washing bath can be water or other non-solvents of cellulose mixed with the ionic liquid. Said temperature of the washing bath is in the range of 10 to 80° C., preferably 20 to 60° C.

In step (3), those methods of reverse washing well known in the art may also be carried out in the present invention. After washing out the ionic liquid, the water or solvents contained in the gel film can be removed by drying methods well known in the art, for example, heating drying under reduced pressure, drum hot air drying, hot roll drying, infrared heating drying, microwave drying, but not limited to these methods.

According to the method of the invention, in step (3), in the coagulation and washing processes of the cellulose gel film, when in the gel film the weight ratio of an ionic liquid solvent to a non-solvent of cellulose is less than 4:1, preferably 3:1, the cellulose gel film is stretched at least 1 time in the transverse direction, preferably 1 to 3 times.

According to the method of the invention, in step (3), the cellulose gel film after being stretched is further washed to remove the residual ionic liquid solvent.

According to the method of the invention, in step (3) the washing bath is water or the other non-solvents of cellulose.

According to the method of the invention, in step (4), in the drying process of the cellulose gel film, tension is applied to the film in the transverse direction and in the longitudinal direction.

According to the method of the invention, in step (4), in the drying process of the cellulose gel film, the film is stretched in the transverse direction and in the longitudinal direction.

According to the method of the invention, in step (4), the total stretch ratio in the transverse direction and in the longitudinal direction can be up to 400%.

According to the method of the invention, in step (1) the cellulose/ionic liquid solution can be obtained by dissolving natural cellulose as raw material in the ionic liquid solvent.

According to the method of the invention, in step (1) said ionic liquid solvent is a mixed solvent comprising an ionic liquid capable of dissolving cellulose and a cellulose-dissolving ionic liquid, or a cellulose-dissolving ionic liquid and other co-solvent.

According to the present invention, said ionic liquid can be an organic molten salt with a melting point below 100° C. formed by an imidazole-type or pyridine-type cation and an anion, preferably those organic molten salts which can dissolve cellulose. Also preferably, the present invention can use mixed ionic liquids to dissolve cellulose, wherein said mixed ionic liquids each can be the ionic liquid which can dissolve cellulose, and also can be a mixture of the ionic liquid which can dissolve cellulose and the ionic liquid which cannot dissolve cellulose.

Preferably, said cation can be any one selected from the following: 1-ethyl-3-methylimidazolium cation, 1-propyl-3-methylimidazolium cation, 1-allyl-3-methylimidazolium cation, 1-butyl-3-methylimidazolium cation, N-ethyl pyridinium cation, N-butyl-pyridinium cation, N-n-hexyl pyridinium cation. Particularly, said cation is preferably any one selected from the following: 1-ethyl-3-methylimidazolium cation, 1-allyl-3-methylimidazolium cation and 1-butyl-3-methylimidazolium cation.

Preferably, said anion can be preferably any one selected from the following: chloride ion, bromide ion, formate ion, acetate ion, propionate ion, butyrate ion and methyl phosphate ion; said anion is, in particular, preferably any one selected from the following: chloride ion, formate ion, acetate ion and methyl phosphate ion.

According to the present invention, said ionic liquid can be used alone or in mixture, or can be mixed with a co-solvent such as N,N-dimethyl sulfoxide, N,N-dimethylformamide, N,N-dimethylacetamide or N-methylpyrrolidone, etc.

According to the present invention, said co-solvent is N,N-dimethyl sulfoxide, N,N-dimethylformamide, N,N-dimethylacetamide or N-methylpyrrolidone.

According to the present invention, cellulose can be natural cellulose. Preferably, the degree of polymerization of natural cellulose as raw material can be in the range of 200 to 2000.

Said cellulose of the invention is selected from at least one of the following cellulosic feedstock: microcrystalline cellulose, cotton pulp, wood pulp, bamboo pulp, skimmed cotton, sugarcane bagasse, wood and cellulose prepared from straw; the degree of polymerization of said cellulose is preferably in the range of 200 to 2000.

Said cellulose solution in ionic liquids of the invention is a homogeneously transparent solution with a cellulose content between 3 and 20% (relative to the weight of the ionic liquid solvent). The dissolution temperature of cellulose is between 50 and 150° C. Well known methods, such as mechanical stirring, microwave, ultrasonication or screw extrusion, can be used to accelerate dispersion and dissolution of cellulose.

The invention also provides a method for preparing a biaxially stretched regenerated cellulose functional film, wherein said method comprises the following steps:

(1) in a cellulose/ionic liquid solution adding an organic and/or inorganic functional additive;

(2) shaping the above-mentioned cellulose/ionic liquid solution added with an organic and/or an inorganic functional additive by die extrusion, calendering and casting;

(3) the shaped solution entering into a coagulation bath to form a cellulose gel film;

(4) in coagulation and washing processes, stretching the cellulose gel film at least 1 time in the transverse direction and at least 1 time in the longitudinal direction;

(5) in drying process, further applying tension to the stretched film in the transverse and longitudinal directions, and finally obtaining regenerated cellulose film by rolling.

When a specific organic and/or inorganic functional additive is added to the cellulose solution, biaxially stretched cellulose functional films can be prepared to be reinforced, toughened and other functionalized.

According to the method for preparing the functional film of the present invention, wherein said organic and/or inorganic functional additive of the invention can be one or more selected from chitin, chitosan, alginic acid, layered nanoclay, graphene, carbon nanotube, halloysite nanotube, carbon nanofiber, carbon black, nano titanium dioxide, nano zinc oxide or nanosilica.

According to the method for preparing the functional film, wherein the content of the organic and/or inorganic functional additive is between 0.1 to 20% by weight (relative to the weight of cellulose in the film).

The invention also provides to produce a biaxially stretched regenerated cellulose film or a functional film by the above-described method.

The invention also provides the application of the above-described cellulose films or the functional films. The films can be used in application fields of the prior art conventional cellulose films or functional films. For example, the film is used in the packaging of products such as food, pharmaceuticals, cosmetics, high-end clothing, precision instruments, etc.

EFFECT OF THE PRESENT INVENTION

Ionic liquids have excellent ability to dissolve cellulose, and the cellulose has a low degradation degree during its dissolution process in ionic liquids. The biaxially stretching technology of the regenerated cellulose film and its functional film according to the present invention, by fully taking the features that the cellulose gel film obtained by using ionic liquid as a solvent has high gel strength as well as high elongation at break, stretches the cellulose gel film in the transverse and longitudinal directions to decrease thickness of the cellulose film while improve the tensile strength and uniformity in thickness in the transverse and longitudinal directions. The obtained regenerated cellulose film and functional film have high performance and therefore can significantly expand the application fields of cellulose.

EXAMPLES

Hereinafter, the present invention will be illustrated with reference to the examples. However, it should be understood by those skilled in the art that the following examples cannot constitute a limitation to the protection scope of the present invention. Any modification and change based on the present invention belong to the protection scope of the present invention.

It should be noted that all existing traditional processes would produce a unidirectional stretching in longitudinal direction, which can be called "uniaxially stretched film", thus leading to vastly different performance of the films between the longitudinal and transverse directions. The present invention improve the prior processes. Films are also stretched in the transverse direction to improve the performance of the films in the transverse direction, together with the previous longitudinal stretching, which is so called biaxial stretching. Since it is considered that the longitudinal stretching process is similar to the conventional processes, the longitudinal stretching process is not specifically emphasized in the embodiment in present invention, but only total stretching ratios in the longitudinal direction are described in Examples.

Example 1

Wood pulp (degree of polymerization 650) was dissolved in the ionic liquid 1-allyl-3-methylimidazolium chloride (AMIMCl) at 90° C. to give a cellulose solution with a concentration of 10% (by weight). After degassing and filtering, the cellulose solution was extruded through a die to enter into a coagulation bath at 50° C. consisting of an aqueous solution containing 5% (by weight) of the ionic liquid, to give an unstretched cellulose gel film. When the weight ratio of the ionic liquid solvent to the non-solvent of cellulose in the film was 1.6:1, the film was stretched to a ratio of 1.5 times in the transverse direction. After stretching, the gel film was further washed in water at 30° C. to remove the ionic liquid. The film when drying was held in the biaxial stretching machine to keep the size in the transverse direction. A biaxially stretched regenerated cellulose film was finally obtained to have the total stretching ratio of 2.5 times in the longitudinal direction, and the total stretching ratio of 1.3 times in the transverse direction. The longitudinal tensile strength is 175 MPa and the transverse tensile strength is 139 MPa.

Comparative Example 1

Wood pulp (degree of polymerization 650) was dissolved in the ionic liquid 1-allyl-3-methylimidazolium chloride (AMIMCl) at 90° C. to give a cellulose solution with a concentration of 10% (by weight). After degassing and filtering, the cellulose solution was extruded through a die to enter into a coagulation bath at 50° C. consisting of an aqueous solution containing 5% (by weight) of the ionic liquid, to give an unstretched cellulose gel film. The gel film was further washed in water as a washing bath at 30° C. to remove the ionic liquid. After dried, a regenerated cellulose film was finally obtained to have the total stretching ratio of 2.5 times in the longitudinal direction and no stretching the transverse direction. The longitudinal tensile strength is 168.6 MPa and the transverse tensile strength is 74.8 MPa.

Example 2

Cotton pulp (degree of polymerization 750) was dissolved in the ionic liquid 1-allyl-3-methylimidazolium chloride (AMIMCl) at 90° C. to give a cellulose solution with a concentration of 8% (by weight). After degassing and filtering, the cellulose solution was extruded through a die to enter into a coagulation bath at 50° C. consisting of an aqueous solution containing 60% (by weight) of the ionic liquid, to give an unstretched cellulose gel film. After being in the above-mentioned coagulation bath, when the weight ratio of the ionic liquid solvent to the non-solvent of cellulose in the film was 4:1, the film was stretched to a ratio of 1.25 times in the transverse direction. After stretching, the gel film was further washed in water at 50° C. to remove the ionic liquid. The film when drying was held in the biaxial stretching machine to keep the size in the transverse direction. After dried, a biaxially stretched regenerated cellulose film was finally obtained to have the total stretching ratio of 1.2 times in the longitudinal direction and the total stretching ratio of 1.1 times in the transverse direction. The longitudinal tensile strength is 170.1 MPa and the transverse tensile strength is 126.2 MPa.

Example 3

Wood pulp (degree of polymerization 650) was dissolved in the ionic liquid 1-ethyl-3-methylimidazolium chloride (EMIMCl) at 100° C. to give a cellulose solution with a concentration of 10% (by weight). After degassing and filtering, the cellulose solution was extruded through a die to enter into a coagulation bath at 50° C. consisting of an aqueous solution containing 15% (by weight) of the ionic liquid, to give an unstretched cellulose gel film. After being in the above-mentioned coagulation bath, when the weight ratio of the ionic liquid solvent to the non-solvent of cellulose in the film was 2.6:1, the film was stretched to a ratio of 1.25 times for the first time in the transverse direction. When the weight ratio of the ionic liquid solvent to the non-solvent of cellulose in the film was 0.7:1, the film was stretched to a ratio of 1.25 times for the second time in the transverse direction. After stretching, the gel film was further washed in water at 30° C. to remove the ionic liquid. The film when drying was held in the biaxial stretching machine to keep the size in the transverse direction. A biaxially stretched regenerated cellulose film was finally obtained to have the total stretching ratio of 2.0 times in the longitudinal direction and the total stretching ratio of 1.4 times in the transverse direction. The longitudinal tensile strength is 185.3 MPa and the transverse tensile strength is 130.2 MPa.

Example 4

Wood pulp (degree of polymerization 650) was dissolved in the ionic liquid 1-butyl-3-methylimidazolium acetate (BMIMAc) at 80° C. to give a cellulose solution with a concentration of 10% (by weight). After degassing and filtering, the cellulose solution was extruded through a die to enter into a coagulation bath at 50° C. consisting of an aqueous solution containing 5% (by weight) of the ionic liquid, to give an unstretched cellulose gel film. When the weight ratio of the ionic liquid solvent to the non-solvent of cellulose in the film was 1.5:1, the film was stretched to a ratio of 1.7 times for the first time in the transverse direction; when the weight ratio of the ionic liquid solvent to the non-solvent of cellulose in the film was 0.6:1, the film was stretched to a ratio of 1.4 times for the second time in the transverse direction; when the content of the ionic liquid solvent was 0%, the film was stretched to a ratio of 1.4 times for the third time in the transverse direction. After stretching, the gel film was further washed in water at 50° C. to remove the ionic liquid. The film when drying was stretched to a ratio of 1.3 times for the fourth time. A biaxially stretched regenerated cellulose film was finally obtained to have the total stretching ratio of 4.0 times in the longitudinal direction and the total stretching ratio of 3.3 times in the transverse direction. The longitudinal tensile strength is 180.3 MPa and the transverse tensile strength is 148.6 MPa.

Example 5

Wood pulp (degree of polymerization 650) was dissolved in the ionic liquid 1-butyl-3-methylimidazolium acetate (BMIMAc) at 70° C. to give a cellulose solution with a concentration of 8% (by weight). After degassing and filtering, the cellulose solution was extruded through a die to enter into a coagulation bath at 20° C. consisting of an aqueous solution containing 20% (by weight) of the ionic liquid, to give an unstretched cellulose gel film. When the weight ratio of the ionic liquid solvent to the non-solvent of cellulose in the film was 1.9:1, the film was stretched to a ratio of 1.3 times for the first time in the transverse direction; after washed in the above-mentioned coagulation bath, when the weight ratio of the ionic liquid solvent to the non-solvent of cellulose in the film was 0.8:1, the film was stretched to a ratio of 1.2 times for the second time in the transverse direction. After stretching, the gel film was further washed in ethanol at 20° C. to remove the ionic liquid. The film when drying was held in the biaxial stretching machine to keep the size in the transverse direction. A biaxially stretched regenerated cellulose film was finally obtained to have the total stretching ratio of 2.0 times in the longitudinal direction and the total stretching ratio of 1.3 times in the transverse direction. The longitudinal tensile strength is 169.0 MPa and the transverse tensile strength is 125.7 MPa.

Example 6

Wood pulp (degree of polymerization 650) was dissolved in the ionic liquid 1-propyl-3-methylimidazolium chloride (AMIMCl) at 100° C. to give a cellulose solution with a concentration of 10% (by weight). After degassing and filtering, the cellulose solution was extruded through a die to enter into a coagulation bath at 60° C. consisting of an aqueous solution containing 5% (by weight) of the ionic liquid, to give an unstretched cellulose gel film. When the weight ratio of the ionic liquid solvent to the non-solvent of cellulose in the film was 0.7:1, the film was stretched to a ratio of 1.4 times for the first time in the transverse direction; after washed in the above-mentioned coagulation bath, when the weight ratio of the ionic liquid solvent to the non-solvent of cellulose in the film was 0.3:1, the film was stretched to a ratio of 1.3 times for the second time in the transverse direction. After stretching, the gel film was further washed in water at 30° C. to remove the ionic liquid. The film when drying was stretched to a ratio of 1.2 times for the third time. A biaxially stretched regenerated cellulose film was finally obtained to have the total stretching ratio of 2.5 times in the longitudinal direction and the total stretching ratio of 1.8 times in the transverse direction. The longitudinal tensile strength is 191.4 MPa and the transverse tensile strength is 143.2 MPa.

Example 7

Cotton pulp (degree of polymerization 750) was dissolved in the ionic liquid 1-butyl-3-methylimidazolium chloride (BMIMCl) at 80° C. to give a cellulose solution with a concentration of 8% (by weight). To the solution was added 3% acidified carbon nanotubes (relative to the weight of cellulose in the film). After mixing, degassing and filtering, the cellulose solution was extruded through a die to enter into a coagulation bath at 30° C. consisting of an aqueous solution containing 10% (by weight) of the ionic liquid, to give an unstretched cellulose gel film. When the weight ratio of the ionic liquid solvent to the non-solvent of cellulose in the film was 0.5:1, the film was stretched to a ratio of 1.4 times for the first time in the transverse direction. After stretching, the gel film was further washed in water at 30° C. to remove the ionic liquid. The film when drying was stretched to a ratio of 1.1 times for the second time in the transverse direction. A biaxially stretched regenerated cellulose film was finally obtained to have the total stretching ratio of 2.0 times in the longitudinal direction and the total stretching ratio of 1.4 times in the transverse direction. The longitudinal tensile strength is 192.2 MPa and the transverse tensile strength is 144.1 MPa.

Example 8

Wood pulp (degree of polymerization 650) was dissolved in a mixed solvent of the ionic liquid 1-allyl-3-methylimidazolium chloride (AMIMCl) and N,N-dimethyl sulfoxide (90:10 weight ratio) at 80° C. to give a cellulose solution with a concentration of 8% (by weight). To the solution was added 5% chitosan (relative to the weight of cellulose in the film). After mixing, degassing and filtering, the cellulose solution was extruded through a die to enter into an aqueous coagulation bath at 30° C. to give an unstretched cellulose gel film. When the weight ratio of the ionic liquid solvent to the non-solvent of cellulose in the film was 0.4:1, the film was stretched to a ratio of 1.6 times in the transverse direction. After stretching, the gel film was further washed in water at 20° C. to remove the ionic liquid and N,N-dimethyl sulfoxide. The film when drying was held in the biaxial stretching machine to keep the size in the transverse direction. A biaxially stretched regenerated cellulose film was finally obtained to have the total stretching ratio of 1.5 times in both the longitudinal and transverse directions, the longitudinal tensile strength of 183.0 MPa and the transverse tensile strength of 146.4 MPa.

Example 9

Wood pulp (degree of polymerization 650) was dissolved in a mixed solvent of the ionic liquid 1-butyl-3-methylimidazolium acetate (BMIMAc) and N,N-dimethylformamide (80:20 weight ratio) at 80° C. to give a cellulose solution with a concentration of 10% (by weight). To the solution was added 2% layered nanoclay (relative to the weight of cellulose in the film). After mixing, degassing and filtering, the cellulose solution was extruded through a die to enter into an aqueous coagulation bath at 40° C. to give an unstretched cellulose gel film. When the weight ratio of the ionic liquid solvent to the non-solvent of cellulose in the film was 0.7:1, the film was stretched to a ratio of 1.5 times for the first time in the transverse direction; when the content of the ionic liquid solvent was 0%, the film was stretched to a ratio of 1.2 times for the second time in the transverse direction. After stretching, the gel film was further washed in water at 20° C. to remove the ionic liquid and N,N-dimethylformamide. The film when drying was held in the biaxial stretching machine to keep the size in the transverse direction. A biaxially stretched regenerated cellulose film was finally obtained to have the total stretching ratio of 1.8 times in the longitudinal direction and the total stretching ratio of 1.6 times in the transverse direction. The longitudinal tensile strength is 205.3 MPa and the transverse tensile strength is 160.1 MPa.

Example 10

Microcrystalline cellulose (degree of polymerization 230) was dissolved in the ionic liquid 1-allyl-3-methylimidazolium chloride (AMIMCl) at 70° C. to give a cellulose solution with a concentration of 15% (by weight). To the solution was added 1% halloysite nanotubes (relative to the weight of cellulose in the film). After mixing, degassing and filtering, the cellulose solution was extruded through a die to enter into an aqueous coagulation bath at 60° C. to give an unstretched cellulose gel film. When the weight ratio of the ionic liquid solvent to the non-solvent of cellulose in the film was 0.3:1, the film was stretched to a ratio of 1.2 times in the transverse direction. After stretching, the gel film was further washed in water at 20° C. to remove the ionic liquid. The film when drying was held in the biaxial stretching machine to keep the size in the transverse direction. A biaxially stretched regenerated cellulose film was finally obtained to have the total stretching ratio of 1.1 times in both the longitudinal and transverse directions, the longitudinal tensile strength of 89.0 MPa and the transverse tensile strength of 85.2 MPa.

Example 11

Wood pulp (degree of polymerization 650) was dissolved in the ionic liquid 1-allyl-3-methylimidazolium chloride (AMIMCl) at 80° C. to give a cellulose solution with a concentration of 8% (by weight). To the solution were added 2% carbon nanofiber (relative to the weight of cellulose in the film) and 2% carbon black (relative to the weight of cellulose in the film). After mixing, degassing and filtering, the cellulose solution was extruded through a die to enter into a coagulation bath at 15° C. consisting of an acetone solution containing 10% (by weight) of the ionic liquid, to give an unstretched cellulose gel film. When the weight ratio of the ionic liquid solvent to the non-solvent of cellulose in the film was 0.3:1, the film was stretched to a ratio of 1.2 times for the first time in the transverse direction. After stretching, the gel film was further washed in water at 20° C. to remove the ionic liquid and acetone. The film when drying was stretched to a ratio of 1.2 times for the second time in the transverse direction. A biaxially stretched regenerated cellulose film was finally obtained to have the total stretching ratio of 1.8 times in the longitudinal and the total stretching ratio of 1.3 times in the transverse directions. The longitudinal tensile strength is 178.9 MPa and the transverse tensile strength is 135.5 MPa.

Example 12

Wood pulp (degree of polymerization 650) was dissolved in the ionic liquid 1-butyl-3-methylimidazolium acetate (BMIMAc) at 70° C. to give a cellulose solution with a concentration of 5% (by weight). To the solution were added 2% alginic acid (relative to the weight of cellulose in the film) and 2% nanosilica (relative to the weight of cellulose in the film). After degassing and filtering, the cellulose solution was extruded through a die to enter into a coagulation bath at 40° C. consisting of an aqueous solution containing 10% (by weight) of the ionic liquid BMIMAc, to give an unstretched cellulose gel film. When the weight ratio of the ionic liquid solvent to the non-solvent of cellulose in the film was 1.1:1, the film was stretched to a ratio of 1.4 times for the first time in the transverse direction; after washed in the above-mentioned coagulation bath, when the weight ratio of the ionic liquid solvent to the non-solvent of cellulose in the film was 0.2:1, the film was stretched to a ratio of 1.3 times for the second time in the transverse direction. After stretching, the gel film was further washed in ethanol at 20° C. to remove the ionic liquid. The film when drying was held in the biaxial stretching machine to keep the size in the transverse direction. A biaxially stretched regenerated cellulose film was finally obtained to have the total stretching ratio of 2.0 times in the longitudinal direction and the total stretching ratio of 1.7 times in the transverse direction. The longitudinal tensile strength is 190.9 MPa and the transverse tensile strength is 152.1 MPa.

From the above-described examples, it has been found that the cellulose films would shrinkage during both the washing and drying processes, but more severe in the transverse direction. Therefore, the total stretching ratios of the final cellulose films were less than the multiple of each stretching ratio. In the comparative example, however, the film was not stretched transversely, resulting in the film with the width less than that of the raw film. The application of stretching in the transverse direction could reduce the shrinkage of the film and increase the width of the film, thus increasing the transverse tensile strength.

The invention claimed is:

1. A biaxially stretched regenerated cellulose film, wherein a stretch ratio of the cellulose film in a transverse direction is between 101% and 400%, and a stretch ratio of the cellulose film in a longitudinal direction is between 110% and 400%, and a ratio of the tensile strength in the longitudinal direction to that in the transverse direction is less than 1.8, and
wherein the cellulose film is a flat film and is obtained by stretching a shaped cellulose/ionic liquid solution at least one time in the transverse direction and at least one time in the longitudinal direction.

2. The cellulose film according to claim 1, wherein the ratio of the tensile strength in the longitudinal direction to that in the transverse direction is less than 1.5.

3. The cellulose film according to claim 1, wherein said cellulose is selected from the group consisting of microcrystalline cellulose, cotton pulp, wood pulp, bamboo pulp, skimmed cotton, sugarcane bagasse, wood, and cellulose prepared from straw, and a degree of polymerization of the cellulose is in the range of 200 to 2000.

4. The cellulose film according to claim 1, wherein said cellulose/ionic liquid solution is shaped by a known method of casting or calendering after being extruded via a die, and then passes through an air gap into a coagulation bath to form a cellulose gel film,
after drying and completely removing the solvents, the cellulose gel film forms a cellulose film,
said coagulation bath is a mixture of an ionic liquid and a non-solvent of cellulose is water, methanol, ethanol or acetone, in the coagulation bath, the weight ratio of an ionic liquid solvent to a non-solvent of cellulose is adjusted in the range of 0 to 150:100, and the temperature of the coagulation bath is in the range of 10 to 80° C.

5. The cellulose film according to claim 1, further comprising an organic functional additive, an inorganic functional additive or both.

6. A method for preparing the biaxially stretched regenerated cellulose film, comprising:
(1) shaping a cellulose/ionic liquid solution comprising cellulose and an ionic liquid solvent by die extrusion, calendaring, and casting to obtain a shaped solution;
(2) coagulating the shaped solution in a coagulation bath to form a cellulose gel film;
(3) stretching the cellulose gel film at least one time in a transverse direction and at least one time in a longitudinal direction to obtain a stretched film; and
(4) drying the stretched film while applying tension to the stretched film in the transverse direction or the longitudinal direction or both, and obtaining the regenerated cellulose film by rolling,
wherein the regenerated cellulose film has a stretch ratio in the transverse direction and a stretch ratio in the longitudinal direction that are not greater than 400%, and a ratio of a tensile strength in the longitudinal direction to a tensile strength in the transverse direction of less than 1.8.

7. The method according to claim 6, wherein in step (2) said coagulation bath is a mixture of an ionic liquid solvent and a non-solvent of cellulose, wherein the non-solvent of cellulose is water, methanol, ethanol, or acetone.

8. The method according to claim 6, wherein, in step (1), the cellulose/ionic liquid solution is obtained by dissolving a natural cellulose as a raw material in the ionic liquid solvent.

9. The method for preparing a biaxially stretched regenerated cellulose film according to claim 6,
wherein the cellulose/ionic liquid solution further comprises one or more functional additive selected from the group consisting of chitin, chitosan, alginic acid, layered nanoclay, graphene, carbon nanotube, halloysite nanotube, carbon nanofiber, carbon black, nano titanium dioxide, nano zinc oxide, and nanosilica.

10. The method according to claim 7, wherein the coagulation bath is a mixture having a weight ratio of the ionic liquid solvent to the non-solvent of cellulose in the range of 0 to 150:100 and the coagulation bath has a temperature of 10° C. to 80° C.

11. The method according to claim 6, wherein, in step (3), when the cellulose gel film has a weight ratio of the ionic liquid solvent to the non-solvent of cellulose of less than 4:1, the cellulose gel film is stretched in the transverse direction and in the longitudinal direction.

12. The method according to claim 6, wherein step (3) further comprising washing the cellulose gel film in a washing bath which is water or the other non-solvents of cellulose, and a temperature of the washing bath is in a range of 10 to 80° C.

13. The method according to claim 6, wherein, in step (4), tension is applied to the film in the transverse direction and in the longitudinal direction.

14. The method according to claim 6, wherein, in step (1), the ionic liquid solvent is an ionic liquid capable of dissolving cellulose, a mixture of more than one cellulose-dissolving ionic liquids, or a mixture comprising a cellulose-dissolving ionic liquid and a co-solvent.

15. The method according to claim 6, wherein the ionic liquid is an organic molten salt with a melting point below 100° C. formed by an imidazolium-type or pyridinium-type cation and an anion.

16. The method according to claim 6, wherein the ionic liquid comprises a cation and an anion, wherein the cation is selected from the group consisting of 1-ethyl-3-methylimidazolium cation, 1-propyl-3-methylimidazolium cation, 1-allyl-3-methylimidazolium cation, 1-butyl-3-methylimidazolium cation, N-ethyl pyridinium cation, N-butyl-pyridinium cation, N-n-hexyl pyridinium cation, and mixtures thereof; and the anion is selected from the group consisting of chloride ion, bromide ion, formate ion, acetate ion, propionate ion, butyrate ion, methyl phosphate ion, and mixtures thereof.

17. The method according to claim 16, wherein the cation is selected from the group consisting of 1-ethyl-3-methylimidazolium cation, 1-allyl-3-methylimidazolium cation, 1-butyl-3-methylimidazolium cation, and mixtures thereof; and the anion is selected from the group consisting of chloride ion, formate ion, acetate ion, methyl phosphate ion, and mixtures thereof.

18. The method according to claim 14, wherein the co-solvent is N,N-dimethyl sulfoxide, N,N-dimethylformamide, N,N-dimethylacetamide, or N-methylpyrrolidone.

19. The cellulose film according to claim 2, wherein the ratio of the tensile strength in the longitudinal direction to that in the transverse direction is less than 1.4.

20. The cellulose film according to claim 4, wherein, after the cellulose/ionic liquid solution enters into the coagulation bath, in the presence of a non-solvent of cellulose, the cellulose coagulates into a gel film.

\* \* \* \* \*